US011148098B2

(12) United States Patent
Jons et al.

(10) Patent No.: US 11,148,098 B2
(45) Date of Patent: Oct. 19, 2021

(54) SPIRAL WOUND MEMBRANE MODULE INCLUDING INTEGRATED DIFFERENTIAL PRESSURE MONITORING (71) Applicant: DDP SPECIALTY ELECTRONIC MATERIALS US, LLC, Wilmington, DE (US)

(72) Inventors: Steven D. Jons, Minneapolis, MN (US); Luke Franklin, Minneapolis, MN (US); Ian A. Tomlinson, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 46 days.

(21) Appl. No.: 16/629,180

(22) PCT Filed: Jun. 20, 2018

(86) PCT No.: PCT/US2018/038400
§ 371 (c)(1),
(2) Date: Jan. 7, 2020

(87) PCT Pub. No.: WO2019/022864
PCT Pub. Date: Jan. 31, 2019

(65) Prior Publication Data
US 2020/0197870 A1 Jun. 25, 2020

Related U.S. Application Data (60) Provisional application No. 62/537,481, filed on Jul. 27, 2017.

(51) Int. Cl.
*B01D 63/10* (2006.01)
*B01D 63/12* (2006.01)
*C02F 1/44* (2006.01)

(52) U.S. Cl.
CPC ......... *B01D 63/106* (2013.01); *B01D 63/103* (2013.01); *B01D 63/12* (2013.01);
(Continued)

(58) Field of Classification Search
CPC .... B01D 63/10; B01D 63/103; B01D 63/106; B01D 63/12; B01D 2313/14;
(Continued)

(56) References Cited

U.S. PATENT DOCUMENTS 4,214,994 A 7/1980 Kitano et al.
4,277,344 A 7/1981 Cadotte
(Continued)

FOREIGN PATENT DOCUMENTS

EP 1844836 A2 10/2007
EP 2682176 A1 1/2014
(Continued)

OTHER PUBLICATIONS

English language machine translation of WO 2011024801, 11 pages.*
(Continued)

*Primary Examiner* — Pranav N Patel
(74) *Attorney, Agent, or Firm* — Edward W. Black; Kenneth Crimaldi (57) ABSTRACT A spiral wound membrane module including a specialized end cap assembly including a connecting conduit defining a passageway extending radially inward from its outer periphery, and a differential pressure sensor connected to the passageway of the connecting conduit.

5 Claims, 5 Drawing Sheets (52) U.S. Cl.
CPC ............... *C02F 1/44* (2013.01); *C02F 1/441* (2013.01); *B01D 2313/21* (2013.01); *B01D 2319/02* (2013.01); *C02F 2209/03* (2013.01); *C02F 2301/08* (2013.01)

(58) Field of Classification Search
CPC ... B01D 2313/21; B01D 2319/02; C02F 1/44; C02F 1/441; C02F 2209/03; C02F 2301/08
See application file for complete search history.

(56) References Cited

U.S. PATENT DOCUMENTS

| | | | |
|---|---|---|---|
| 4,795,559 | A | 1/1989 | Shinjou et al. |
| 5,128,037 | A | 7/1992 | Pearl et al. |
| 5,435,957 | A | 7/1995 | Degen et al. |
| 5,538,642 | A | 7/1996 | Solie |
| 5,851,267 | A | 12/1998 | Schwartz |
| 5,919,026 | A | 7/1999 | Appleton |
| 6,074,595 | A | 6/2000 | Eisberg et al. |
| 6,156,680 | A | 12/2000 | Goettmann |
| 6,165,303 | A | 12/2000 | Darby et al. |
| 6,224,767 | B1 | 5/2001 | Fujiwara et al. |
| 6,299,772 | B1 | 10/2001 | Huschke et al. |
| 6,632,356 | B2 | 10/2003 | Hallan et al. |
| 6,878,278 | B2 | 4/2005 | Mickols |
| 6,936,160 | B2 | 8/2005 | Moscaritolo et al. |
| 7,048,775 | B2 | 5/2006 | Jornitz et al. |
| 7,048,855 | B2 | 5/2006 | de la Cruz |
| 7,198,719 | B2 | 4/2007 | Chikura et al. |
| 7,208,088 | B2 | 4/2007 | Almasian et al. |
| 7,875,177 | B2 | 1/2011 | Haynes et al. |
| 7,886,582 | B2 | 2/2011 | Donaque |
| 7,951,295 | B2 | 5/2011 | Larson et al. |
| 8,110,016 | B2 | 2/2012 | McCollam |
| 8,142,588 | B2 | 3/2012 | McCollam |
| 8,210,042 | B2 | 7/2012 | Mickols et al. |
| 8,221,522 | B2 | 7/2012 | DiLeo et al. |
| 8,272,251 | B2 | 9/2012 | Jons et al. |
| 8,377,300 | B2 | 2/2013 | Katayama et al. |
| 8,388,842 | B2 | 3/2013 | Shelby et al. |
| 8,388,848 | B2 | 3/2013 | Odaka et al. |
| 8,425,773 | B2 | 4/2013 | Bonta et al. |
| 8,519,559 | B2 | 8/2013 | Konishi et al. |
| 8,568,596 | B2 | 10/2013 | Konishi et al. |
| 8,617,397 | B2 | 12/2013 | Ikeyama et al. |
| 8,778,182 | B2 | 7/2014 | Johnson et al. |
| 8,808,539 | B2 | 8/2014 | Karabelas et al. |
| 9,381,469 | B2 | 7/2016 | Elwell et al. |
| 2007/0209977 | A1 | 9/2007 | Wilf et al. |
| 2008/0029595 | A1 | 2/2008 | Waller et al. |
| 2008/0030850 | A1 | 2/2008 | Wolleschensky |
| 2008/0295951 | A1 | 12/2008 | Hiro et al. |
| 2008/0308504 | A1 | 12/2008 | Hallan et al. |
| 2011/0101145 | A1 | 5/2011 | Maemura et al. |
| 2013/0026090 | A1 | 1/2013 | Johnson et al. |
| 2013/0161258 | A1 | 6/2013 | Marschke et al. |
| 2014/0180610 | A1 | 6/2014 | Chatterjee et al. |
| 2015/0144559 | A1* | 5/2015 | Taniguchi ............. B01D 65/08 210/650 |
| 2017/0252700 | A1 | 9/2017 | Goto et al. |

FOREIGN PATENT DOCUMENTS

| | | | |
|---|---|---|---|
| EP | 2853307 | A1 | 4/2015 |
| JP | 62049902 | A | 11/1987 |
| JP | 2011/045843 | A | 3/2011 |
| JP | WO2011024801 | * | 3/2011 |
| JP | 2012/176370 | A | 9/2012 |
| JP | 05287789 | B2 | 9/2013 |
| JP | 2016/019932 | A | 2/2016 |
| WO | 97/06693 | A1 | 2/1997 |
| WO | 2012/117669 | A1 | 9/2012 |
| WO | 2013/033616 | A1 | 3/2013 |
| WO | 2014/151695 | A2 | 9/2014 |
| WO | 2016/035704 | A1 | 3/2016 |
| WO | 2017/019282 | A1 | 2/2017 |

OTHER PUBLICATIONS

International Search Report, dated Oct. 20, 2017, for International Application No. PCT/US2017/042530, filed Jul. 18, 2017; ISA/EPO; Authorized officer Florian Kukolka.

International Search Report, dated Sep. 26, 2018, for International Application No. PCT/US2018/038400, filed Jun. 20, 2018; ISA/EPO; Authorized officer Bernd Goers.

International Search Report, dated Jun. 18, 2018, for International Application No. PCT/US2018/023215 filed Mar. 20, 2018; ISA/EPO; Authorized officer Bernd Goers.

Malavasi, et al., Flow Measurement and Instrumentation, 28 (2012) 57-66.

* cited by examiner

SPIRAL WOUND MEMBRANE MODULE INCLUDING INTEGRATED DIFFERENTIAL PRESSURE MONITORING

FIELD

The invention generally relates to spiral wound membrane modules and related assemblies useful in conducting fluid separations.

INTRODUCTION

Spiral wound membrane modules are used in a wide variety of fluid separations. In a conventional embodiment, one or more spiral wound reverse osmosis (RO) or nanofiltration (NF) membrane modules ("elements") are serially connected within a common pressure vessel. Large water treatment facilities typically include multiple trains and/or stages of vessels, each including from 6-8 spiral wound membrane modules. After operation, fouling and scaling of individual modules leads to an undesired pressure reduction and as consequence, reduced separation performance. For example, the lead (upstream) module is often prone to biofouling whereas the terminal (downstream) module is often more prone to scaling. Monitoring of pressure at various points in the assembly helps identify pressure loss and allows an operator to take appropriate measures, e.g. selective replacement of modules, increase pretreatment of feed fluid, more aggressive cleaning of modules, etc. But the monitoring of pressure loss is difficult given that the modules are sealed within pressure vessels. Nevertheless, a variety of techniques have been developed, see for example: US2014/0180610, U.S. Pat. Nos. 8,808,539, 8,617,397, 8,568,596, 8,519,559, 8,272,251, U.S. Pat. Nos. 8,210,042, 7,886,582, US2011/10114561, WO2012/117669 and JP2016/019932. Similar techniques have also been used on other types of filtration devices, e.g. U.S. Pat. Nos. 6,936,160, 7,048,775 and 8,221,522. Less complicated monitoring systems are desired, including those that offer one or more of the following: i) little modification of existing modules and pressure vessels, ii) use of fewer or simpler sensors and iii) the avoidance of retractable probes.

SUMMARY

The invention includes a spiral wound membrane module and related assembly including a pressure vessel, their method of manufacture and use, and combinations of such assemblies. In a preferred embodiment, the subject spiral wound membrane module includes at least one membrane envelope wound about a permeate collection tube extending along an axis between an opposing first module end and second module end; and an end cap assembly located upon at least one of the opposing module ends. The end cap assembly includes an inner hub secured to the permeate collection tube and a concentric outer ring that defines an outer periphery of the end cap assembly. The outer ring is connected to the inner hub by a plurality of radially extending supports separated by apertures that provide a fluid access pathway with the module. The end cap assembly further includes a connecting conduit that defines a fluid passageway extending radially inward from a first conduit end located at the outer periphery of the outer ring to a second conduit end located within the outer ring, and a differential pressure sensor connected to the fluid passageway of the connecting conduit.

In another embodiment, the invention includes an assembly comprising a plurality of spiral wound membrane modules axially aligned in serial arrangement within the chamber of a pressure vessel with a first or "lead" module located adjacent the first vessel end and a second or "terminal" module located adjacent the second vessel end. In a preferred embodiment, the first or second module, or both first and second modules within the pressure vessel, includes the subject end cap assembly and differential pressure sensor. This approach permits the early detection of biofouling which typically first occurs in the first (most upstream) module and scaling which typically first occurs in the second (most downstream) module. Alternatively other modules within the assembly, or all the modules of the assembly, may include the subject end cap assembly and differential pressure sensor. Many additional embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

The present invention includes a spiral wound membrane module suitable for use in reverse osmosis (RO) and nanofiltration (NF) systems. Such modules include one or more RO or NF membrane envelops and feed spacer sheets wound about a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions— depending upon the species of divalent ion. NF membranes also typically reject particles in the nanometer range as well as organic molecules having molecular weights greater than approximately 200 to 500 Daltons. For purposes of this description, the term "hyperfiltration" encompasses both RO and NF.

Figure 1:
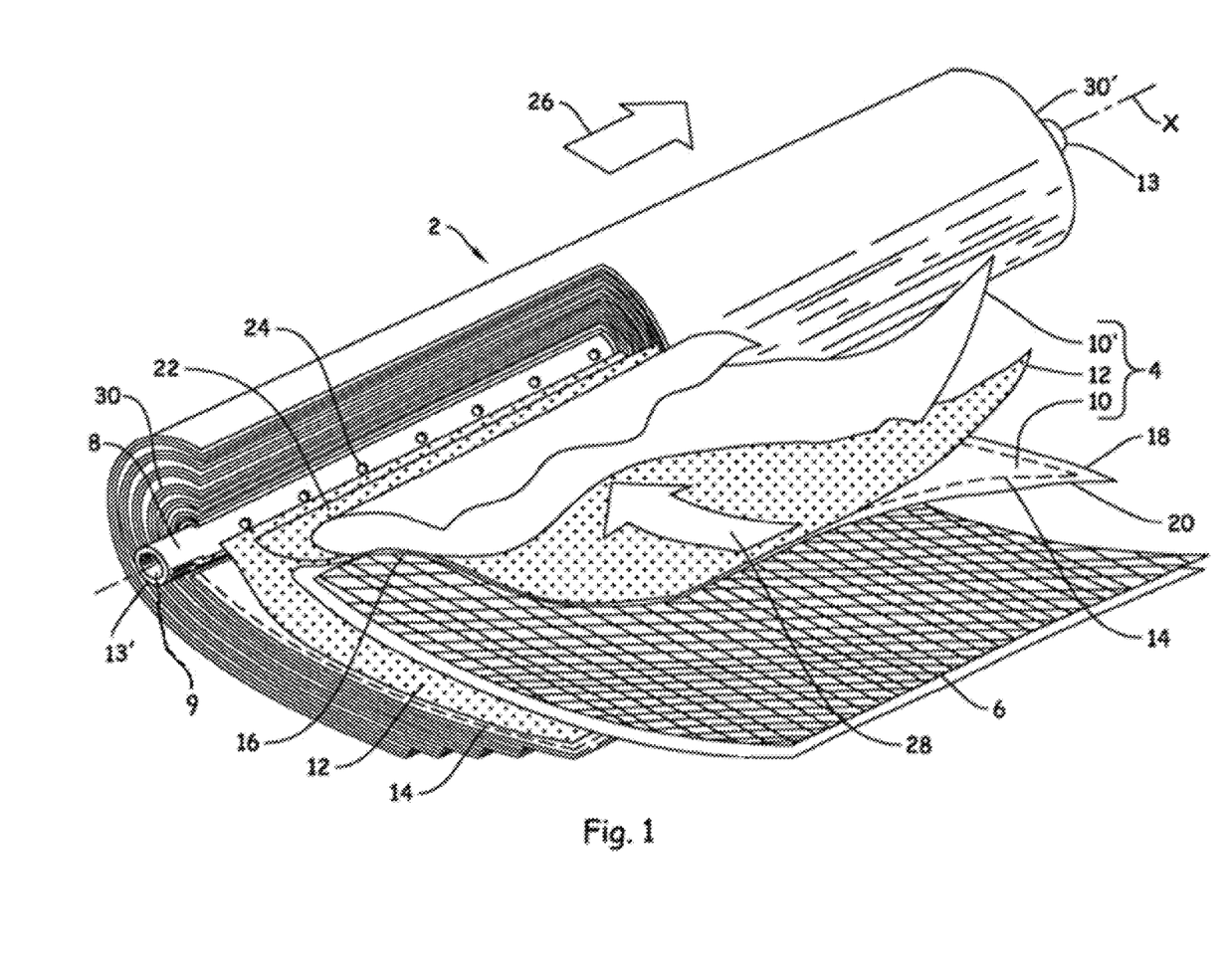
FIG. 1 is a perspective, partially cut-away view of a partially assembled spiral wound membrane module.

A representative spiral wound membrane module is generally shown at 2 in FIG. 1. The module (2) is formed by concentrically winding one or more membrane envelopes (4) and optional feed spacer sheet(s) ("feed spacers") (6) about a permeate collection tube (8). The permeate collection tube (8) includes an inner periphery (9) and length extending along an axis (X) between opposing first and second ends (13', 13) and includes a plurality of openings (24) along a portion of its length. Each membrane envelope (4) preferably comprises two substantially rectangular sections of membrane sheet (10, 10'). Each section of membrane sheet (10, 10') has a membrane or front side and support or back side. The membrane envelope (4) is formed by overlaying membrane sheets (10, 10') and aligning their edges. In a preferred embodiment, the sections (10, 10') of membrane sheet surround a permeate spacer sheet (12). This sandwich-type structure is secured together, e.g. by sealant (14), along three edges (16, 18, 20) to form an envelope (4) while a fourth edge, i.e. "proximal edge" (22) abuts the permeate collection tube (8) so that the inside portion of the envelope (4) (and optional permeate spacer (12)) is in fluid communication with the openings (24) extending along a portion of the length of the permeate collection tube (8). The module (2) may include a single envelope or a plurality of membrane envelopes (4) each separated by a feed spacer sheet (6). In the illustrated embodiment, membrane envelopes (4) are formed by joining the back side surfaces of adjacently positioned membrane leaf packets. A membrane leaf packet comprises a substantially rectangular membrane sheet (10) folded upon itself to define two membrane "leaves" wherein the front sides of each leaf are facing each other and the fold is axially aligned with the proximal edge (22) of the membrane envelope (4), i.e. parallel with the permeate collection tube (8). A feed spacer sheet (6) is shown located between facing front sides of the folded membrane sheet (10). The feed spacer sheet (6) facilitates flow of feed fluid through the module (2). While not shown, additional intermediate layers may also be included in the assembly. Representative examples of membrane leaf packets and their fabrication are further described in U.S. Pat. Nos. 7,875,177 and 8,608,964. Prototypical membranes for reverse osmosis are FilmTec Corporation's FT-30™ type membranes, made by an interfacial polymerization of polyfunctional amine and acyl halide monomers upon a porous support.

During module fabrication, permeate spacer sheets (12) may be attached about the circumference of the permeate collection tube (8) with membrane leaf packets interleaved therebetween. The back sides of adjacently positioned membrane leaves (10, 10') are sealed about portions of their periphery (16, 18, 20) to enclose the permeate spacer sheet (12) and to form a membrane envelope (4). Suitable techniques for attaching the permeate spacer sheet to the permeate collection tube are described in U.S. Pat. No. 5,538,642. The membrane envelope(s) (4) and feed spacer(s) (6) are wound or "rolled" concentrically about the permeate collection tube (8) extending along an axis (X) to form two opposing scroll faces at module ends (30, 30') which respectively serve as an inlet and outlet for feed liquid. The resulting spiral bundle is held in place by tape or other means. The scroll faces of the module may then be trimmed and a sealant may optionally be applied at the junction between the scroll face and permeate collection tube (8) as described in U.S. Pat. No. 7,951,295. An impermeable layer such as tape may be wound about the circumference of the wound module as described in U.S. Pat. Nos. 8,142,588 and 8,668,828. In alternative embodiments, a porous tape or fiberglass coating may be applied to the module's periphery. See for example U.S. Pat. No. 9,623,379.

With further reference to FIG. 1, in operation pressurized feed fluid (water) enters the module (2) at a first end (30), i.e. "upstream," and flows in a generally axial direction through the module and exits as concentrate at the opposing second end (30') in the direction shown by arrow (26), i.e. "downstream." Permeate flows along a permeate flow path generally shown by arrow (28) which extends through the membrane (10, 10') and into the membrane envelope (4) where it flows into the openings (24), through the permeate collection tube (8) and exits the second end (13) of the tube (8).

Figure 2:
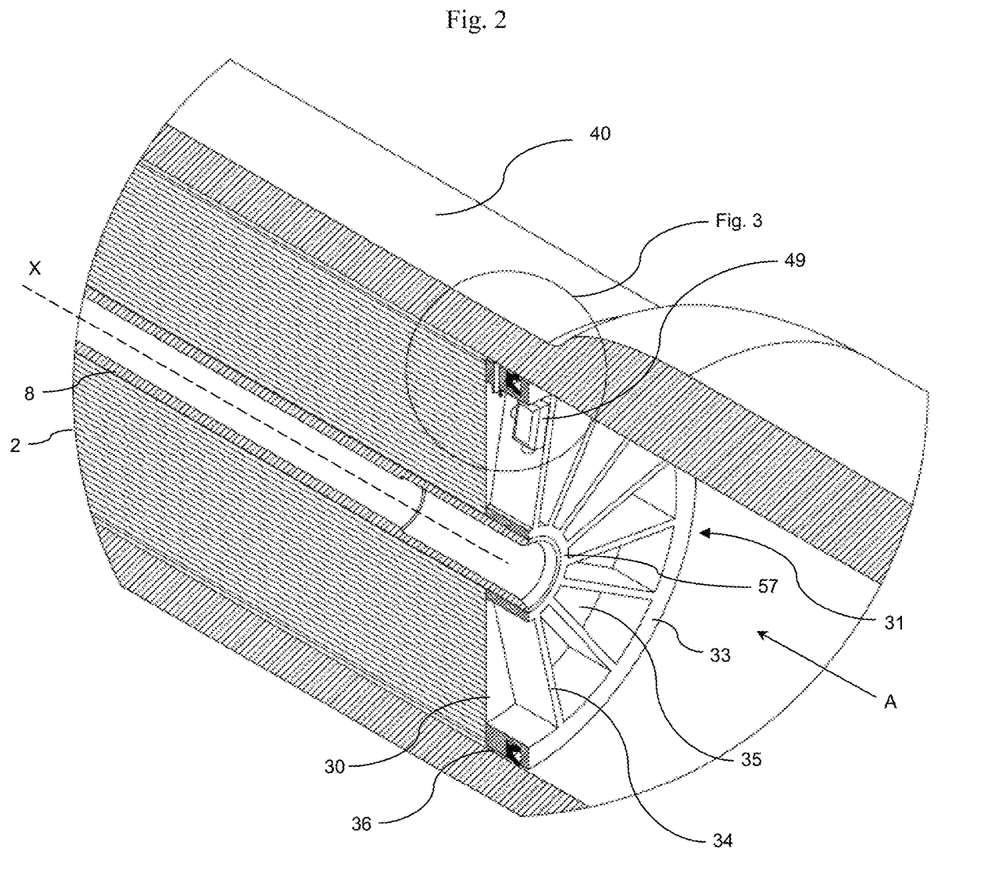
FIG. 2 is a perspective, partially cut-away view of a spiral wound membrane module assembly showing a spiral wound membrane module including an end cap assembly located within a pressure vessel.
Figure 3:
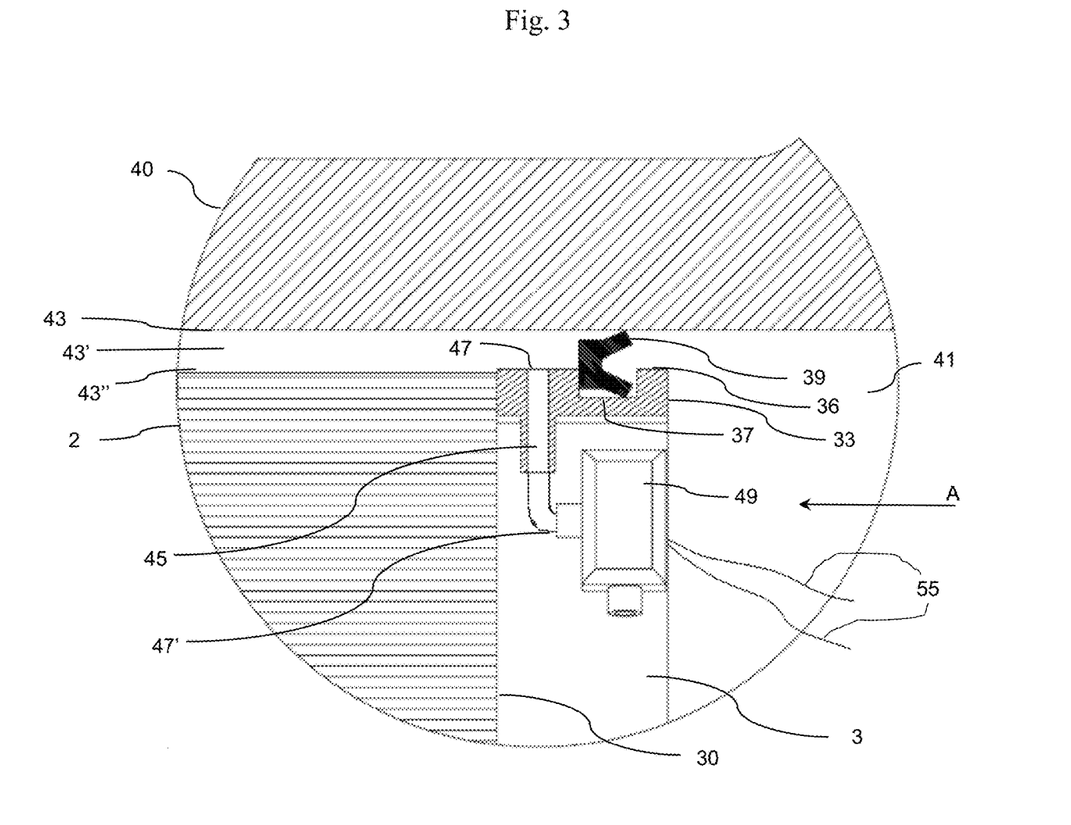
FIG. 3 is a cross-sectional view of the spiral wound membrane module assembly partially cut away from FIG. 2, illustrating feed/concentrate flow paths (A) along with a connecting conduit and pressure sensor.

As best shown in FIGS. 2-3, an end cap assembly (31) (also referred to as an "anti-telescoping device") is located upon at least one end (30 or 30') of the module (2). To facilitate description, the ends (30, 30') of the module are distinguished from each other as a "first" module end (30) serving as an inlet for fluid flowing into the module and a "second" module end (30') serving as an outlet for fluid flow from the module. As shown, the end cap assembly (31) is located at the first end (30) of the module (2). However, it will be appreciated by those skilled in the art that the end cap assembly may be alternatively located at the second end (30') of the module (2), or located at both ends (30, 30') of the module. Indeed, in a preferred embodiment not shown, end cap assemblies are located at both ends (30, 30') of each spiral wound membrane module within a pressure vessel. The configuration of the end cap assembly (31) is not particularly limited but preferable comprises a centrally located, axially aligned end cap inner hub (57). The end cap inner hub (57) may be secured to the permeate collection tube (8) or it may concentrically surround an interconnector tube ((46) shown in FIG. 5) extending from the permeate collection tube (8). In a preferred embodiment shown in FIG. 2, the end cap inner hub (57) fits concentrically about the permeate collection tube (8). The end cap inner hub (57) may be secured by way of tight concentric fit, adhesive, welding, or the like. The end cap inner hub (57) is preferably connected to a concentric outer ring (33) by a plurality of radially extending supports (34), e.g. "spokes." The supports (34) are separated by end cap apertures (35) that provide a fluid access pathway with the module (2), e.g. liquid flow into or out of the ends (30, 30') of the module (2) depending upon which end the end cap assembly is located. A representative fluid access pathway is generally indicated by solid arrow (A). Representative examples are described in U.S. Pat. Nos. 5,128,037, 5,851,267, 6,632,356, 8,425,773 and WO2014/151695. As best shown in FIG. 3, the outer ring (33) defines an outer periphery (36) that is generally co-extensive with the outer periphery of the module (2) and includes an annular groove (37) along with a brine seal (39) located in the annular groove (37) adapted for sealing engagement with the inner peripheral surface (43) of the pressure vessel (40). When located within a pressure vessel, the brine seal restricts fluid from bypassing the module (2) and flowing along the space (43') between the outer periphery (43") of the module (2) and the peripheral surface (43) of the pressure vessel (40). Representative examples are described in: U.S. Pat. Nos. 6,299,772, 8,110,016, and WO2017/019282. A variety of types of seals may be used, e.g. O-ring, Chevron seal, U-shaped seal, split ring seal, etc. See for example: U.S. Pat. Nos. 6,224,767, 7,198,719, 8,377,300, 8,388,842, 8,377,300 and 9,381,469.

At least one end cap assembly (31) of a spiral wound membrane module (2) includes a connecting conduit (45) defining a fluid passageway extending radially inward from a first conduit end (47) located at the outer periphery (36) of the outer ring (33) to a second conduit end (47') located within the outer ring (33), e.g. at a location adjacent to a support (34) and in fluid communication with the end of the module (2). The first conduit end (47) is preferably axially located between the brine seal (39) and the opposite end (30') of the module (2), e.g. adapted to be in fluid communication with the peripheral space (43') located between the outer periphery (43") of the module (2) and the peripheral surface (43) of the pressure vessel (40). In a preferred embodiment, the end cap assembly (31) is located on the "upstream" first end of a module (2), and the first conduit end (47) is located "downstream" from the brine seal (39), wherein connecting conduit (45) provides a passageway between the first end (30) of the module (2) and the peripheral space (43'). Similar openings for use in allowing fluid bypass around the brine seal have been described in: JP05287789, JP62049902, U.S. Pat. Nos. 5,128,037, 7,208, 088, 8,778,182 and US2013/0161258. U.S. Pat. No. 8,377, 300 illustrates openings in the side of an end cap useful in removing brine seals. As described below, in this invention fluid flow through the connecting conduit (45) is prevented by a barrier suitable for use in measuring differential pressure.

A differential pressure sensor (49) is connected to the fluid passageway of the connecting conduit (45) and is adapted to measure pressure difference between an end cap aperture (35) inside the outer ring (33) of the module end cap assembly (31) and a region of the peripheral space (43') between the brine seal (39) and the opposite end (30') of the module (2). This allows a measurement of difference in pressure across the brine seal (39) and approximates the difference in pressure between the first and second ends (30, 30') of the module (2). The differential pressure sensor (49) is preferably located within a region surrounded by the end cap assembly (31), e.g. secured to the end cap assembly such as to an inner surface of the concentric outer ring (33) or to one of the supports (34) as shown in FIGS. 2-3. In this way, the outwardly facing surface of the end cap assembly (31) remains unobstructed and can be secured against an end cap assembly of an adjacently positioned spiral wound membrane module. In some embodiments, the differential pressure sensor (49) is encased or "potted" within a protective polymeric resin (e.g. thermoset or thermoplastic material), thus enabling it to function at feed pressures exceeding 10 bar, more preferably exceeding 15 bar, or even exceeding 20 bar. Preferred potting materials include urethanes, epoxies and hot melts. In preferred embodiments, the differential pressure sensor may include two ports, one of which is joined to the connecting conduit (45) in fluid communication with the peripheral space (43') between the brine seal (39) and the opposite end (30') of the module (2) and another port in fluid communication with theend cap aperture (35) inside the outer ring (33) of the module end cap assembly (31).

Figure 4A:
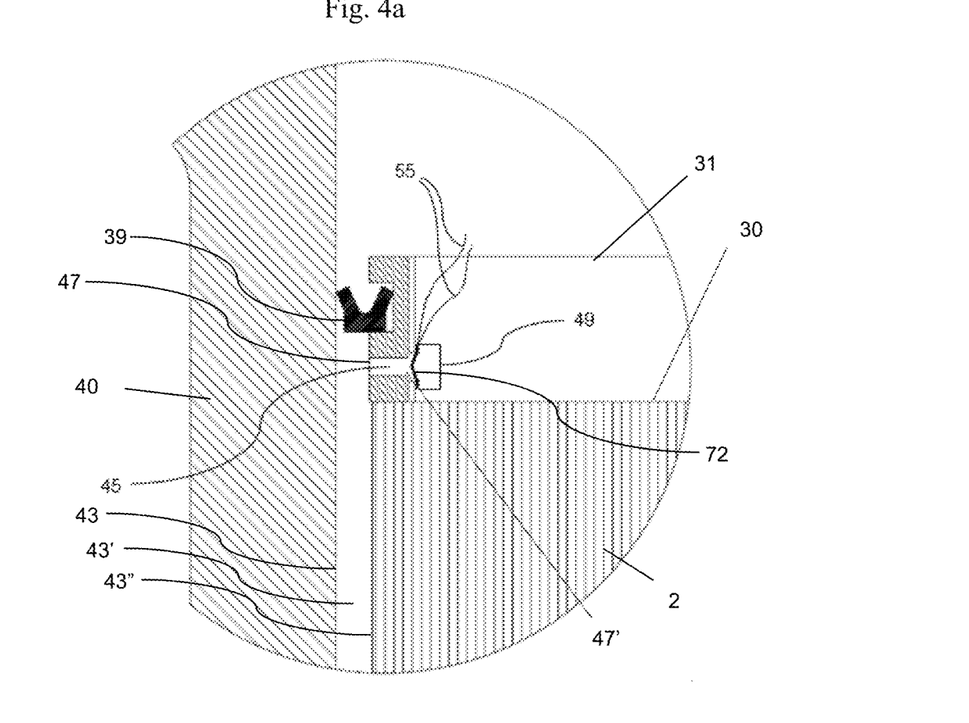
FIG. 4a is a cross-sectional view showing another embodiment of an end cap assembly showing another embodiment of a pressure sensor including a stretchable film that prevents flow through the connecting conduit and includes a resistive strain gauge.
Figure 4B:
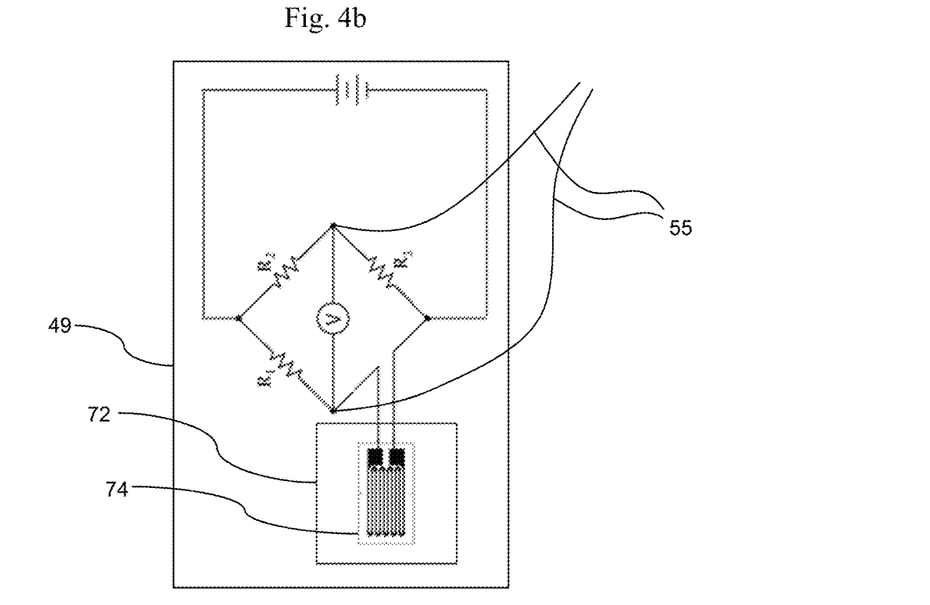
FIG. 4b is a schematic view showing an electrical circuit applicable to the subject pressure sensor.

With reference to FIGS. 3 and 4, the differential pressure sensor (49) may include power and signal leads or wires (55) in communication with one or more of an external power source, signal processor and storage device located outside the pressure vessel (40). For example, power or signal leads (55) may extend from the differential pressure sensor (49) through the feed inlet port (42), concentrate outlet port (42'), or permeate outlet port (44) to an externally located device, such as a micro-processing unit. In other embodiments, leads (55) transmitting power or signal (e.g. via voltage, current, light etc.) may extend from the differential pressure sensor (49) to such a device (e.g. micro-processing unit (not shown) located within the gap space (56, 56') of the pressure vessel (40). Alternatively, the sensor may include an internal battery as a source of power, or be passive using energy from an interrogating source to supply a signal, and may communicate to the signal processor by way of radio, light or other means that do not require a physical lead or wire. Alternatively, the sensor (49) may communicate with another sensor located within the pressure vessel (e.g. gap space (56) shown in FIG. 5) that in turn communicates with an externally located device (e.g. micro-processing unit).

In a preferred embodiment, the differential pressure sensor (49) includes a deformable barrier (72) (e.g. diaphram) to provide simple, reliable, and low cost means to measure differential pressure. The deformable barrier (72) prevents flow through the connecting conduit (45), enables differential pressure measurements and separates the end cap aperture (35) inside the outer ring (33) of the module end cap assembly (31) from a region of the peripheral space (43') between the brine seal (39) and the opposite end (30') of the module (2). Pressure difference across the deformable barrier (72) may result in a change in electrical properties (e.g. resistance, capacitance) and this component may be integrated into electronic circuits to provide a measurement of the differential pressure. Alternatively, deformation of the barrier layer may be detected optically (e.g. by camera or by its deflection or scattering of light) or through modulation of sound. A deformable barrier (72) may also include an antenna that modulates electromagnetic waves to enable passive measurement of different pressure.

Examples of powered differential pressure sensors include Omega's PX26-001DV, Dwyer 629C-02-CH-P2-E5-S1, and Cole-Parmer EW-68071-52. These differential pressures sensors contain two ports for connection to regions of different pressures. A first port may be provided in fluid communication with an end cap aperture (35) inside the outer ring (33) of the module end cap assembly (31). A second port may be in sealing engagement with the second conduit end (47') of the connecting conduit (45). This type of configuration is illustrated in FIG. 3 and is adapted to measure differences in pressure between the first end (47) of the connecting conduit (45) and the first end (30) of the module (2). This pressure difference approximates the pressure difference between fluid upstream of the module and downstream of the module.

In another embodiment, a strain gauge (74) (e.g. Omega's SGD-LY series) including oriented metal wires on a stretchable film (72) is provided in fluid communication with the connecting conduit. This embodiment is illustrated in FIGS. 4a-b. Due to this stretching, an increased difference in pressure between regions upstream and downstream of the brine seal results in an increase in the strain gauge resistance. Electrical circuits, which may be incorporated as part of the sensor (49), allow modified electrical properties to be converted to signals read by a micro-processing unit. For example, the quarter-bridge strain gauge circuit depicted in FIG. 4b enables a modified resistance in the strain gauge (74) to be converted to voltage difference, and a powered micro-processing unit may read this and provide corresponding output. (In the illustrated case, wires (55) may be connected to an amplifier, A2D, or to the analog input pins of a micro-processing unit.) Alternatively, the change in electrical resistance may be used in an antenna circuit to modulate radio waves and provide a passive (without internal power) measurement of differential pressure. In preferred embodiments, the resistive element is preferably encapsulated within plastic to isolate it from surrounding solutions.

In still another embodiment, deflection of a film including an antenna may be used to detect differential pressure. For example, Drazan, J F., et al., Archimedean spiral pairs with no electrical connections as passive wireless implantable sensors, J. Biomedical Technology and Research, 2014, 1(1): page 8; describes a pressure sensor formed from two adjacent spiral antenna, separated by a compressible media. In a variation of this embodiment, an antenna within a deformable barrier (72) may be in fluid communication with the connecting conduit (45) and its distance from a second fixed antenna varies with the differential pressure. In this passive sensor, a radio wave is applied and the returning signal is modulated by the distance between the two antenna segments.

When used, the sensor is preferably packaged to isolate degradable components from liquid but allow it to contact pressure on opposing sides. Thin and flexible liquid barrier layers that separately contact the two surface (and surround these degradable components) can be sufficient for this purpose. Degradable components used to measure pressure drop that may be contained within the barrier layers include electrical components resistors, capacitors, or antennae.

The types of micro-processing units are not particularly limited and applicable examples include an autonomous integrated circuit as AD5931 from Analog Devices and integrated circuits such a model CC2430 or CC2530 from Texas Instruments. Further examples include Arduino and Raspberry Pi boards. The micro-processing unit preferably includes flash memory for storing protocol, control functions, and data. The micro-processing unit may be secured to at least one of the removable end plate (54). When located within the pressure vessel, the micro-processing unit may be encapsulated in potting material. Preferably, the micro-processing unit is surrounded by the end cap assembly (31).

In a preferred embodiment, one or more (e.g. 6-10) spiral wound membrane modules are housed within a pressure vessel, collectively referred to as a "spiral wound assembly." The vessel includes a feed inlet port, concentrate outlet port and permeate outlet port. The feed inlet port is adapted for connection with a pressurized source of feed liquid. The concentrate outlet port is adapted for connection to a pathway for re-use or disposal. The permeate outlet port is adapted for connection to a pathway for storage, use, or further treatment. Pressure vessels used in the present invention are not particularly limited but preferably include a solid structure capable of withstanding pressures associated with operating conditions. The vessel structure preferably includes a chamber having an inner periphery corresponding in size and shape to that of the outer periphery of the spiral wound membrane modules to be housed therein. The orientation of the pressure vessel is not particularly limited, e.g. both horizontal and vertical orientations may be used. Examples of applicable pressure vessels, module arrangements and loading are described in: U.S. Pat. Nos. 6,074, 595, 6,165,303, 6,299,772 and US 2008/0308504. Manufacturers of pressure vessels for large systems include Pentair of Minneapolis Minn., Bekaert of Vista Calif. and Bel Composite of Beer Sheva, Israel.

Figure 5:
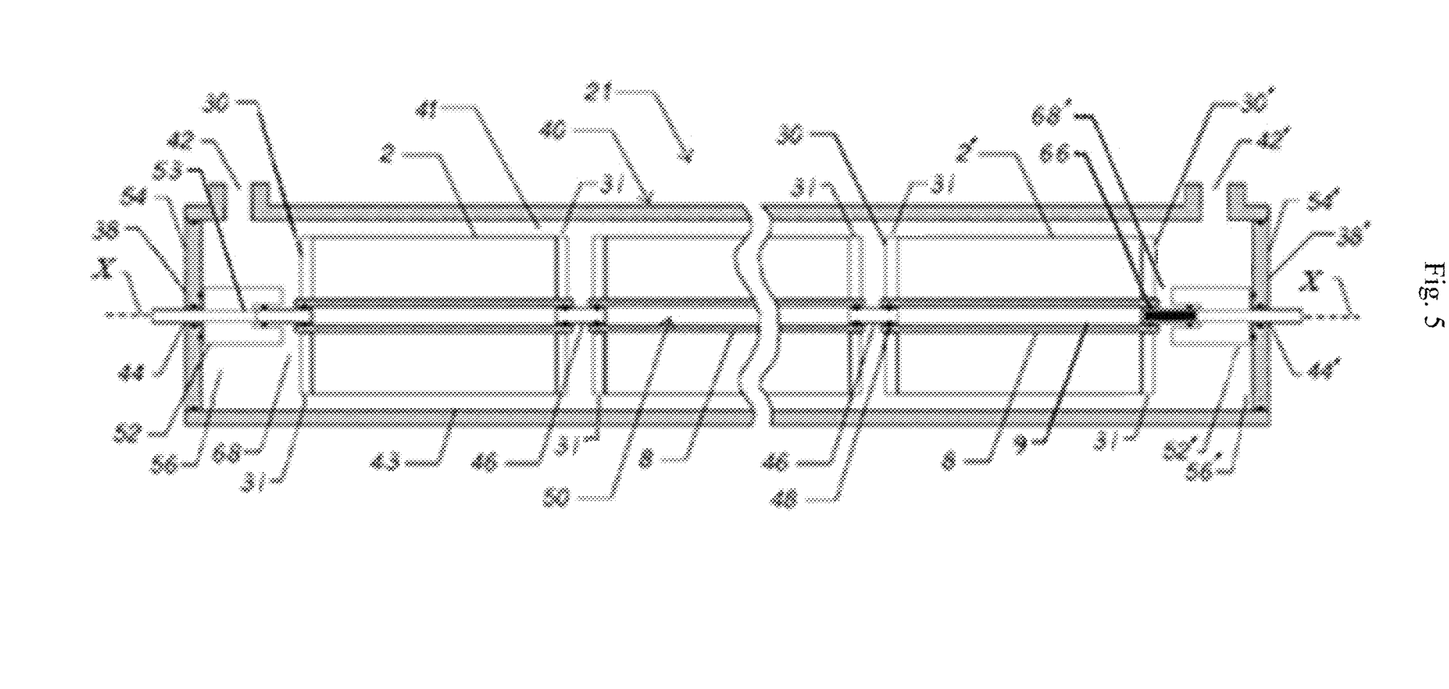
FIG. 5 is a cross-sectional view of a spiral wound membrane module assembly including a plurality of spiral wound membrane modules axially aligned in a serial relationship within a pressure vessel. To facilitate description, end cap assemblies are not shown.

A typical embodiment of a spiral wound membrane module assembly is generally shown at 21 in FIG. 5. To facilitate description, details of end cap assemblies (31), including the brine seal (39) and pressure sensor (49) are not shown. As shown, the assembly includes a plurality of spiral wound membrane modules (2, 2') axially aligned (along axis X) in a serial arrangement within a pressurizable chamber (41) of a pressure vessel (40). The chamber (41) includes a peripheral surface (43) that encloses the modules (2, 2'). The permeate collection tubes (8) of adjacent modules (2, 2') may be joined by interconnectors (46) along with a permeate seal (48). The effect of the joined tubes (8) is to define a combined permeate collection region (50) for the vessel (40). The pressure vessel (40) extends along a central axis (X) between a first and second vessel end (38, 38'). The vessel (40) includes at least one removable end plate (54) located at one end (38, 38') of the vessel (40). Removal of the vessel end plate (54) allows the chamber (41) to be loaded and unloaded with modules (2). In typical embodiments, removable vessel end plates (54, 54') may be located at both vessel ends (38, 38'). The vessel (40) includes several fluid ports (42, 42', 44, and 44'), e.g. at least one feed inlet port (42), concentrate outlet port (42') and permeate outlet port (44). Additional ports may be included, e.g. feed inlet ports, concentrate outlet ports and permeate outlet ports (44, 44') at each end (38, 38') of the vessel. Similarly, the feed inlet and concentrate outlet ports may be provided in reversed orientation from that shown in FIG. 5. For simplicity of description, the feed inlet and concentrate outlet ports may be generically referenced by port (42/42'). While shown in a radial configuration, one or more feed and concentrate ports may assume an axial configuration extending through the ends (38, 38') of the vessel (40). A gap space (56, 56') is located within the chamber (41) between the ends (38, 38') of the vessel (40) and nearest module (2, 2').

As shown, permeate adapter tubes (52) may be located at either or both ends (38, 38') of the vessel (40) in fluid communication with the permeate collection tube (8) of the nearest axially aligned spiral wound membrane module. For example, a permeate adapter tube (52) may be provided in sealed fluid communication with the permeate collection tube (8) of the first spiral wound membrane module (2) and the permeate outlet port (44). In preferred embodiments, the permeate adapter tube (52) comprises a hollow conduit (53) that defines a sealed passageway for permeate to pass from the first spiral wound membrane module (2) to the permeate outlet port (44), e.g. from the permeate collection region (50) to exit the vessel (40). Alternatively, a permeate adapter tube (52) may include a plug (66) sealed within the inner periphery (9) of the permeate collection tube (8) of the second spiral wound membrane module (2'), so that the plug seals one end (38') of the permeate collection region (50) and prevents permeate from passing from the permeate collection region (50) to the permeate outlet port (44'). In the embodiment of FIG. 5, gap spaces (56, 56') are shown near both ends (38, 38') of the vessel (40) along with corresponding permeate adaptor tubes (52, 52'). The permeate adapter tube (52) may be a single integral unit or it may comprise a plurality of parts that join to form a unit sealing to both the nearest module (2, 2') and the permeate outlet port (44). For instance, the permeate adapter tubes (52, 52') illustrated in FIG. 5 each include a first part that comprises a permeate pipe passing through the permeate outlet port (44, 44') into the vessel (40) and a second mating part that comprises a connection to the permeate collection tube (8) of the nearest module (2, 2'). The two parts are illustrated as sealed by an O-ring. The permeate adapter tube (52) on the left is illustrated with a hollow conduit (53) that provides a sealed passageway for permeate to pass from the permeate collection tube (8) of its nearest spiral wound membrane module, i.e. the first spiral wound membrane module (2), and exit the vessel (40). The permeate adapter tube (52') on the right includes a plug (66) that is sealed within the permeate collection tube (8) of the nearest spiral wound membrane module, i.e. the second spiral wound membrane module (2'). The plug (66) seals the permeate collection region (50), including the hollow inside (9) of this permeate collection tube (8), from an adjacent region (68, 68') of pressurized feed or concentrate solution within the vessel (40). This prevents pressurized feed or concentrate solution from entering the permeate collection tube (8).

In a preferred embodiment, three or more modules are located within a pressure vessel (40) wherein the first (lead) module (2) is located adjacent the first vessel end (38), the second (terminal module (2') is located adjacent the second vessel end (38'), and other modules are located between these first and second modules. At least one end cap assembly (31) of at least one spiral wound membrane module within the vessel (40) includes the previously described connecting conduit (45) and differential pressure sensor (49). In one preferred embodiment, only one of the first module (2) or second (last) module (2') within the vessel (40) includes an end cap assembly (31) with the connecting conduit (45) and differential pressure sensor (49). In other embodiments, both the first and last spiral wound membrane modules within a pressure vessel (40) include the subject end cap assembly (31) including the previously described connecting conduit (45) and differential pressure sensor (49). This approach permits the early detection of biofouling which typically first occurs in the first (most upstream) module and scaling which typically first occurs in the last (most downstream) module. Alternatively other modules within the assembly, or all the modules of the assembly may include the subject end cap assembly and differential pressure sensor. An end cap assembly (31) containing the connecting conduit (45) and differential pressure sensor (49) may be located on either end of a module (2, 2'). However, for the first and last spiral wound membrane modules within a pressure vessel (4), locating it on the module end (30, 30') nearest the gap space (56, 56') can facilitate removal of signal. In preferred embodiments, the pressure sensor (49) may communicate (e.g. via wires, light, or sound) with a micro-processor located within the gap space (56, 56').

Many embodiments of the invention have been described and in some instances certain embodiments, selections, ranges, constituents, or other features have been characterized as being "preferred." Such designations of "preferred" features should in no way be interpreted as an essential or critical aspect of the invention. Expressed ranges specifically include end points. The entire content of each of the aforementioned patents and patent applications are incorporated herein by reference.

The invention claimed is:

1. A spiral wound membrane module (2) comprising:
   at least one membrane envelope (4) wound about a permeate collection tube (8) extending along an axis (X) between an opposing first module end (30) and second module end (30'); and
   an end cap assembly (31) located upon at least one of said module ends (30, 30'), wherein the end cap assembly (31) comprises: an inner hub (57) secured to the permeate collection tube (8) and a concentric outer ring (33) that defines an outer periphery (36) of the end cap assembly (31), wherein the outer ring (33) is connected to the inner hub (57) by a plurality of radially extending supports (34) separated by apertures (35) that provide a fluid access pathway (A) with the module (2);

wherein the spiral wound membrane module (2) is characterized by:
   the end cap assembly (31) comprising a connecting conduit (45) defining a fluid passageway extending radially inward from a first conduit end (47) located at the outer periphery (36) of the outer ring (33) to a second conduit end (47') located within the outer ring (33), and a differential pressure sensor (49) connected to the fluid passageway of the connecting conduit (45).

2. The spiral wound membrane module (2) of claim 1 wherein the end cap assembly (31) includes an annular groove (37) located on the outer periphery (36) of the outer ring (33), a brine seal (39) located within the annular groove (37), and wherein the first end (47) of the connecting conduit (45) is axially positioned between the brine seal (39) and the opposite end of the module (2).

3. The spiral wound membrane module (2) of claim 1 wherein the differential pressure sensor (49) is encased within a polymeric resin.

4. A spiral wound module assembly (39) comprising:
   a) a pressure vessel (40) comprising: a chamber (41) including an inner peripheral surface (43) extending along an axis (X) between a first vessel end (38) and a second vessel end (38'), and at least one feed inlet port (42), concentrate outlet port (42') and permeate outlet port (44);
   b) a plurality of spiral wound membrane modules (2, 2') axially aligned in serial arrangement within the chamber (41) with a first module (2) located adjacent the first vessel end (38) and a second module (2') located adjacent the second vessel end (38'), wherein each spiral wound module comprises at least one membrane envelope (4) wound about a permeate collection tube (8) extending along an axis (X) between an opposing first module end (30) and second module end (30'); and
   an end cap assembly (31) located upon at least one of said module ends (30, 30') of at least one of the spiral wound membrane modules, wherein the end cap assembly (31) comprises: an inner hub (57) secured to the permeate collection tube (8) and a concentric outer ring (33) that defines an outer periphery (36) of the assembly (31), wherein the outer ring (33) is connected to the inner hub (57) by a plurality of radially extending supports (34) separated by apertures (35) that provide a fluid access pathway (A) with the module (2), an annular groove (37) located on the outer periphery (36) of the outer ring (33), and a brine seal (39) located within the annular groove (37) in sealing engagement with the inner peripheral surface (43) of the chamber (41);

wherein the spiral wound assembly (39) is characterized by the end cap assembly (31) comprising:
   i) a connecting conduit (45) defining a fluid passageway extending radially inward from a first conduit end (47) located at the outer periphery (36) of the outer ring (33) axially between the annular groove (37) and the opposite end of the module (2) to a second end (47') located within the outer ring (33), and
   ii) a differential pressure sensor (49) connected to the fluid passageway of the connecting conduit (45).

5. The spiral wound module assembly (39) of claim 4 wherein the differential pressure sensor (49) includes a diaphragm that separates fluid communication between the first module end (30) and the second module end (30').

* * * * *